Figure 1:
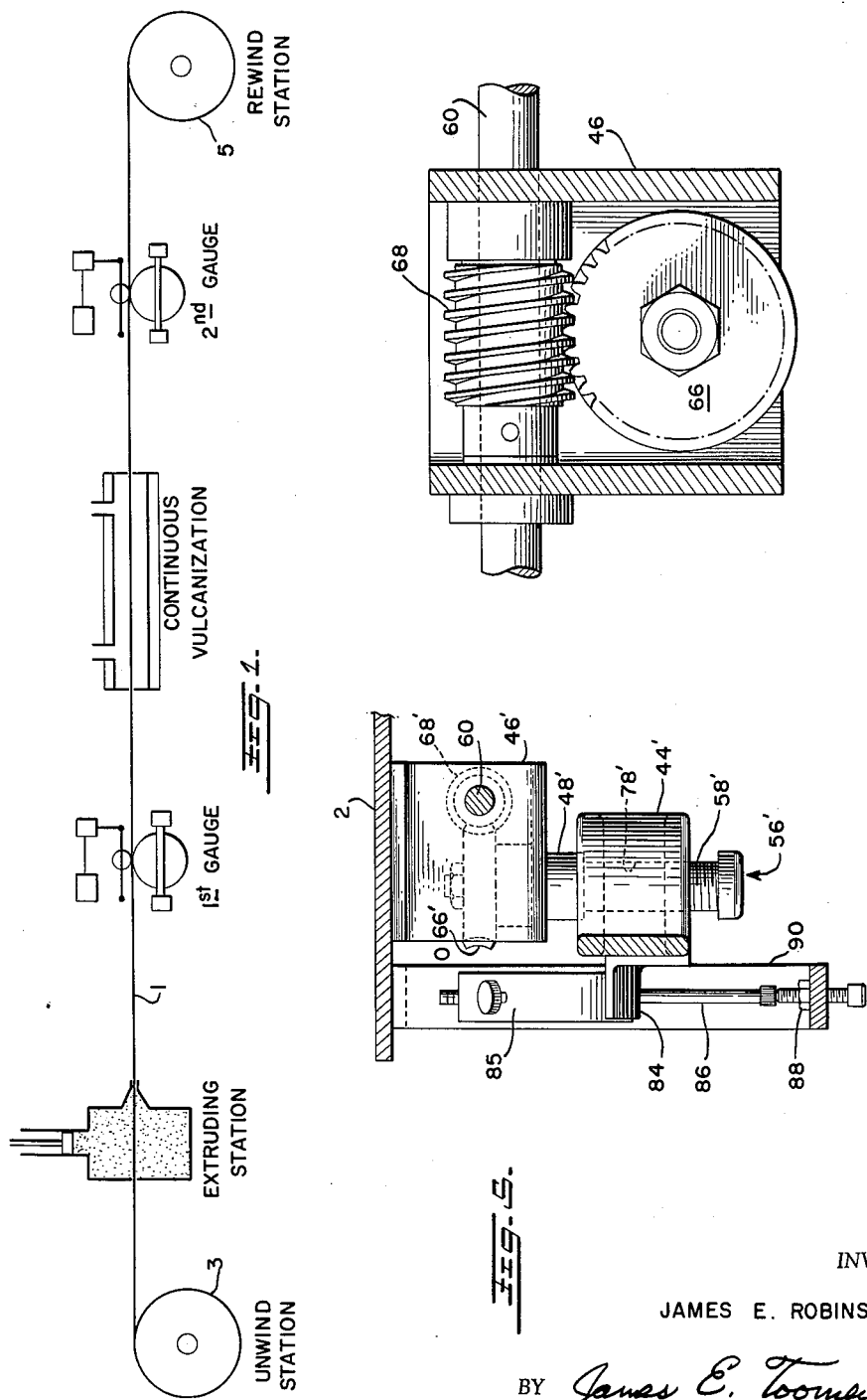

May 15, 1962

J. E. ROBINSON 3,034,218

APPARATUS FOR CONTINUOUS GAUGING

Filed Nov. 1, 1957

3 Sheets-Sheet 1

INVENTOR

JAMES E. ROBINSON

BY *James E. Toomey*

ATTORNEY

May 15, 1962

J. E. ROBINSON 3,034,218

APPARATUS FOR CONTINUOUS GAUGING

Filed Nov. 1, 1957

3 Sheets-Sheet 2

INVENTOR
JAMES E. ROBINSON

BY James E. Toomey

ATTORNEY

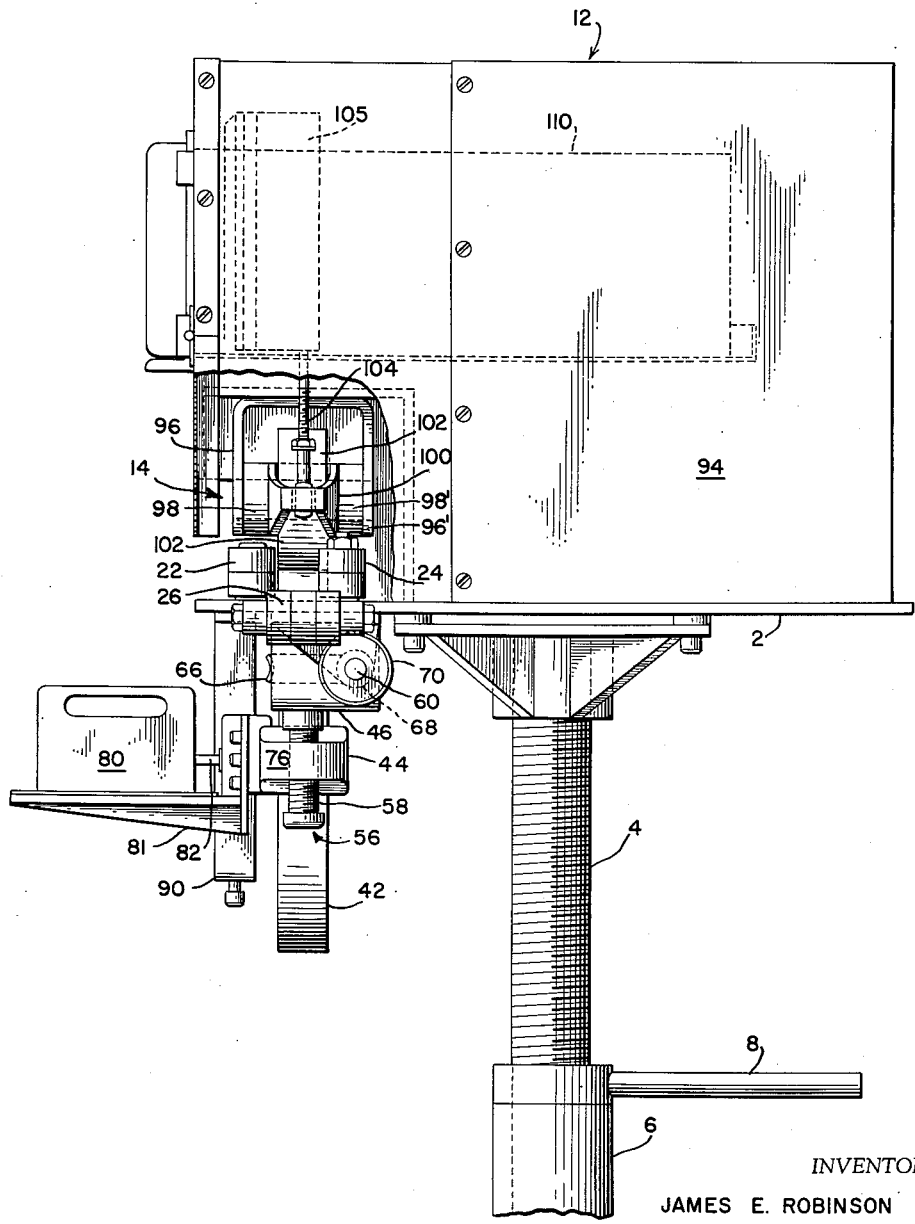

United States Patent Office 3,034,218
Patented May 15, 1962

1

3,034,218
APPARATUS FOR CONTINUOUS GAUGING
James E. Robinson, Centerdale, R.I., assignor to Kaiser Aluminum & Chemical Corporation, Oakland, Calif., a corporation of Delaware
Filed Nov. 1, 1957, Ser. No. 693,841
7 Claims. (Cl. 33—148)

This invention relates to recording apparatus. More particularly, the invention is concerned with recording devices of the type wherein it is desirable to obtain a continuous record of the dimensions of an article being manufactured in a continuous process, such as sheet and foil rolling, paper manufacturing, and the like. An excellent example of use to which the present invention may be put is in a continuous vulcanization process for applying insulation to an electrically conductive core. In such a process, the insulation material is generally extruded about the core as it is passed through an extruding apparatus and then, the resultant product is passed through a continuous vulcanization apparatus wherein the insulation, usually a rubber or rubber-like synthetic composition, is cured under conditions of heat and pressure. Obviously, control of the amount of insulation extruded about the continuously moving core is critical since the serviceability of such insulated conductor is dependent to a considerable extent on the provision of proper insulation. To obtain proper control of the insulation thickness, it is equally obvious that some means must be provided whereby the final dimensions of the insulation may be checked or gauged. It is this latter function that is served by the present invention.

Additionally, it is most desirable that the gauging apparatus be of the continuously recording type wherein a complete production run of a product may be gauged as it progresses through the various media acting upon it rather than of the type wherein the manufacturing process must be periodically stopped to enable measurement or the obtaining of samples for laboratory checks or measurement.

The present invention then deals with a continuously recording thickness or dimension recording gauge which may be used to check a run of a product continuously during manufacture and which may find use in a great number of such processes, some of which have been outlined above.

There have been many such devices developd for the purpose contemplated by the instant invention. However, these prior devices have all been possessed of inherent weaknesses which are overcome by the present invention which has for an object the production of a continuous recording thickness gauge that is reliable, accurate and may be used in long production runs.

Another object of the invention is to produce a continuous gauging device which is not susceptible to errors or drift due to dust, water, etc., encountered during normal shop use.

Still another object of the invention is to produce an apparatus of the type described which can be set, reset and used by semi-skilled or unskilled operators.

A further object of the invention is to provide a gauging device which will handle articles over considerable ranges of dimensional variations.

Still a further object of the invention is to provide a gauging device which will not be adversely affected by passage therethrough of large lumps, knots or unusual variations in the dimensions of the article being gauged.

An additional object of the invention is to provide a gauging apparatus of the contact-type wherein the pressure exerted by the contacts with the product being gauged is firm yet light, such that the gauge may be used to check products having soft or uncured coatings sensitive to pressure. Another object of the invention is to provide a gauging device in which the mechanical components are reduced to a minimum and such mechanical components as are used transmit impulses to pneumatic components which affect a continuous record of the variations in dimensions of the product being gauged.

The above mentioned and other objects of the invention not specifically mentioned but inherent therein are accomplished by providing a pair of roller contacts between which the product to be gauged passes, one of which is mounted on a fine adjustment carriage disposed below the product and adjustable with respect to a given reference plane usually passing through the centerline of the product, the other roller being mounted on a pivoted lever arm which in turn is connected to a pneumatic conversion unit which converts mechanical motion to pneumatic pressure, the latter being used to actuate a recording device consisting of a continuously moving chart inscribed upon by a pneumatically controlled pen.

Figure 2:
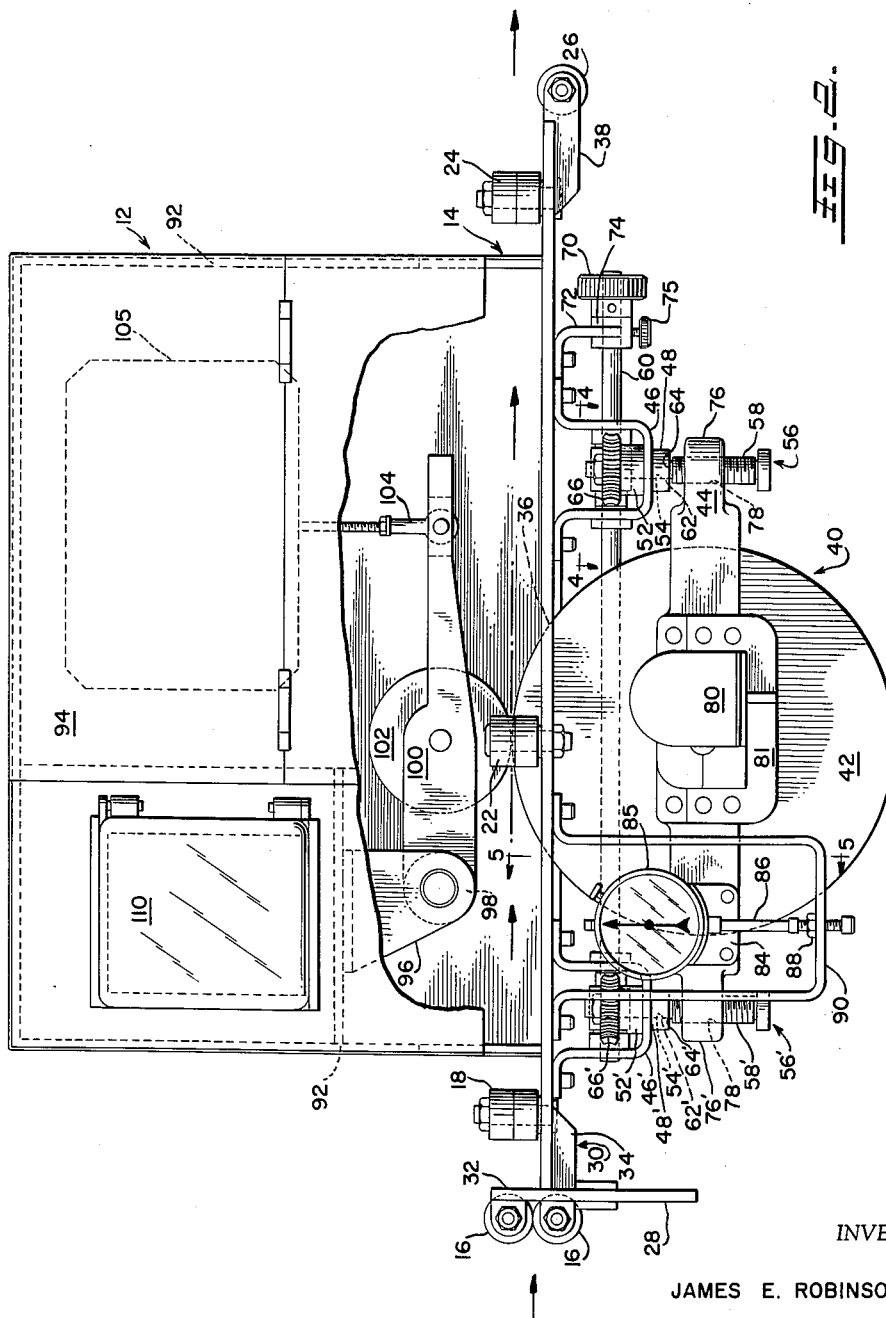

Now, in describing the invention in detail, reference is made to the accompanying drawings forming a part of the disclosure, wherein it will be seen that FIGURE 1 is a schematic view of a continuous production process illustrating several points therein where the apparatus defining the invention may be used, and FIGURE 2 is a side elevational view of the invention, certain parts being broken away, FIGURE 3 is an end view of the apparatus disclosed in FIGURE 2, FIGURE 4 is a sectional view taken along the line 4—4 of FIGURE 2, FIGURE 5 is a sectional view taken along the line 5—5 of FIGURE 2.

Referring now to FIGURE 1, it may be seen that the invention is applied to an electrical conductor insulating process to check and continuously record the thickness of insulation being deposited around a metal conductive core. The core 1 is unwound from a reel 3 at the unwind station passing through an extruding machine. At this point a plastic, rubber or rubber-like covering of dielectric material is extruded about the continuously moving metal conductive core. As the core merges from the extruding station, it passes through a first gauging device where the overall diameter of the core and deposit material is checked and the dimensions continuously recorded. The product is then passed through a continuous vulcanizing chamber wherein the insulation is cured under heat and pressure. As the now complete product emerges from the latter apparatus its dimensions are again checked prior to the time the completed product is rewound on reel 5 at the rewind station. It will be appreciated that if the speed of the product through the gauges corresponds in a known ratio to the speed of the record charts in the gauges a continuous record of the diameter of each foot of product is obtained. An inspection of these records then will reveal any deviations from the desired normal dimension of the insulation and since the exact place is identifiable, the fault portion or portions may be readily located, removed or otherwise corrected.

In considering FIGURES 2 and 3, it is to be noted that the product enters one end of the gauging apparatus and emerges from the other, in this case from left to right in the direction of the arrow shown in FIGURE 2.

Considering briefly initially FIGURE 3, it may be seen that the gauge assembly is carried upon a flat platform member 2. The platform 2 is provided with a vertical column comprised of an inner and an outer telescopically arranged rod and tube 4 and 6, respectively. Preferably, the inner rod 4 has a threaded exterior and is engaged by a hand operated nut 8 whereby its position with respect to the surrounding tube 6 may be adjusted to a fine degree. The lower end (not shown) of the tube 6 may be anchored to a suitable foundation, pedestal or the like, or may be fixed to the frame of any machine in conjunction with which the gauge is to be used, in any suitable manner.

The platform 2 defines the bottom of a substantially closed chamber defined by a box-like housing 12 which rests upon it. The housing 12 is fixed to the platform 2 in any desired manner such as to enable its ready removal from the platform 2 to permit access to the working components contained therein. It suffices to say presently that the housing contains all of the sensing and recording elements or units and all may be removed as a single unitized assembly from the platform 2. It will be noted that, as seen in FIGURE 3, a portion of three vertical walls of the housing 2 are removed such that a tunnel-like passageway 14 is provided on one side of the housing. It is through this tunnel-like passageway 14 that the product passes and is gauged.

Referring now to FIGURE 2, it may be seen that the platform 2 is provided with a series of guide rollers 16, 18, 22, 24 and 26. The guide rolls 18, 22 and 24 are disposed in staggered relation across the plate 2 in the tunnel-like passageway 14 and are so arranged as to form a horizontal guideway for the example product, through the passageway 14. To accomplish this purpose the rollers 16 are journaled in a bracket assembly 30 such that they rotate about horizontal axes. The upper roller of these rollers 16 is also adjustable relative to the lower roller which is fixed to the bracket assembly 30, this adjustment being accomplished by journaling the upper roller in a yoke having a downwardly projecting tongue 28 which passes through a slot 32 provided in and between journal arms 34 which support the lowermost roller of the guide roller 16.

The guide rolls 16, 18, 22 and 24 are arranged so as to form a staggered roll path through the apparatus, in other words the product passes on one side of roll 18, the opposite side of guide roll 22 and finally, over the same side of roll 24 as that on which it passed roll 18. Thus, the product can be accurately guided through the tunnel-like passageway 14 in a smooth longitudinal movement.

Guide rolls 16 and 26, the latter mounted in a manner similar to the lowermost of the horizontal rollers 16, act at the edges of the platform 2 to prevent abrasion of the product as it passes through the tunnel-like passage 14 and over the platform 2. The purpose of this arrangement will become more apparent subsequently.

The platform 2 is further provided with an elongated slot 36. This slot 36 is disposed such as to extend longitudinally in the passageway 14. Thus, as the insulated conductor passes through the apparatus, it will be guided by guide rollers 16, 18, 22, 24 and 26 such that it passes over slot 38 parallel to its longer dimension and preferably, though not necessarily, the center line of the product is aligned vertically with the center line of the slot 36.

Disposed beneath the platform 2 is what may be conveniently designated a reference roll assembly 40. Reference roll assembly 40 comprises a reference roll 42 carried by a bifurcated bar member 44. It will be apparent that reference roll 42 is journaled in the bifurcated bar 44 such that it may rotate about a horizontal axis which is normal to the direction in which the insulated conductor moves through the gauging device. It will also be apparent that the reference roll 42 is of such diameter and is so positioned that its outer, cylindrical, peripheral surface projects upward through the aforementioned slot 36 provided in the platform 2.

The bifurcated bar 44 is adjustable vertically with respect to the platform 2, for a purpose to be herein described. In order to provide for very fine and accurate adjustment of the bar 44 and hence, reference roll 42 with respect to platform 2, it will be seen that bolted to the bottom of platform 2 are a pair of longitudinally aligned bracket members 46, 46'. These brackets are also aligned with the center line of longitudinal slot 36 in platform 2. The bottoms of each bracket 46, 46' are provided with sleeve members 48, 48' and spacer members 52, 52', respectively, the spacers 52, 52' being disposed between the legs of the respective U-shaped brackets 46, 46' while the sleeves 48, 48', are disposed beneath and welded to the bottom of these brackets. The sleeves 48, 48', the bottoms of the brackets 46, 46' and the spacers 52, 52' are provided with vertical openings 54, 54'. Each opening 54, 54' receives a screw-jack member 56, 56'. Each of these members comprises a head, a threaded portion 58, 58', respectively, and a reduced portion 62, 62'. Between the threaded portions 58, 58' and the reduced portions 62, 62' of each screw-jack there is thus provided annular shoulders 64, 64', respectively. It will be seen then that the screw-jacks are inserted in the apertures 54, 54' such that the annular shoulders 64, 64' bear against the sleeves 48, 48' while the reduced portions 62, 62' extend through the sleeves 48, 48', brackets 46, 46' and spacers 52, 52', respectively and projects upwardly above the top of each spacer 52, 52'.

Referring to FIGURE 4 as well as FIGURES 2 and 3, it may be seen that to the upwardly projecting reduced portions 62, 62' of each of the screw-jacks 56, 56' there is keyed or otherwise fixed a pinion 66, 66', the lower surfaces of which engage spacers 52, 52'. The pinions 66, 66' may be locked to the screw-jack members 56, 56' by any suitable means so long as when the pinions 66, 66' rotate the screw-jacks 56, 56' rotate also. Further, since annular shoulders 64, 64', abut sleeves 48, 48' and pinions 66, 66' abut spacer members 52, 52' vertical movement of the screw-jacks 56, 56' in brackets 46, 46' is prevented.

Brackets 46, 46' are provided with further apertures defining journals through which is passed a rotatable rod member 60. This rod member 60 rotates about a horizontal axis and is so positioned adjacent each pinion 66, 66' that its outer surface is in close proximity to peripheral surfaces of the pinions 66, 66'. One end of the threaded rod 60 is provided with a knurled knob 70 by means of which it may be manually rotated.

The rod 60 is provided with a pair of sleeve members 68, 68' each of which is of such length as to fit within the parallel vertical sides of the U-shaped brackets 46, 46' such that they may rotate therein but may not move in an axial direction between the legs of the brackets, as clearly shown in FIGURE 4. Each of these sleeve members 68, 68' is locked to shaft 70 so as to rotate therewith. Such conventional means as set screws, keys, etc., and/or the like may be used to fix the sleeve members 68, 68' to the rod 60. The outer surfaces of these sleeve members 68, 68' are threaded and it will be readily apparent that the threaded surfaces are aligned with pinions 66, 66' so as to define therewith a worm and pinion drive. Thus, as knob 70 is moved in one direction or the other the sleeve members 68, 68' cause pinions 66, 66' to rotate which in turn causes rotation of the jack-screws 56, 56'.

Preferably, one additional bracket is used in this case, namely, an inverted L-shaped bracket 72. One leg of bracket 72 is fixed to the undersurface of platform 2 while the other leg is disposed vertically and includes a journal 74 through which rod 60 passes. The journal 74 is provided with a manually operable set screw 75 which moves radially inwardly and outwardly toward and away from the rod 60 where it passes through the journal 74. This radially disposed set screw 75 serves as a lock to prevent rotation of rod 60 unless desired.

It will be seen that the bifurcated bar member 44 carrying reference roller 42 is terminated at its ends with apertured ears 76, 76' both of which are provided with apertures 78, 78' having threaded interiors. The threaded portions 58, 58' of jack-screws 56, 56' pass through and are in engagement with the threaded interiors of apertures 78, 78'. Thus, as jack-screws 56, 56' are rotated in one direction or the other, the bar member 44 will move upward or downward as desired with respect to the platform 2. As a consequence, the lower reference roller 42 will project through the slot 36 in platform 2 to a greater or lesser extent.

The thread advance of the jack-screws 56, 56' and the high gear ratio effected by the meshing pinions and worm defining sleeves 66, 66' and 68, 68' enables vertical adjustment of the roller 42 to a very fine degree, and in thousandths of an inch, if desired.

Mounted on the bifurcated bar 44 is a bracket 81. Mounted on bracket 81 and connected to the reference roller 42 by a shaft 82 is a counter device 80. Preferably this counter device records the number of feet of cable passing through the device. This result can easily be effected by selection of proper gearing in the counter mechanism such that a given number of r.p.m.'s of reference roller 42 corresponds to one foot of product passing thereover. Preferably the counter also records tenths of feet.

As shown in FIGURE 5, the bifurcated bar member 44 is also provided with a further bracket 84 which is removable, but rigidly fixed thereto as by screws or the like. Mounted in this bracket is a dial gauge 85. Dial gauge 85 is of conventional design and includes a plunger rod 86, a calibrated dial, a pointer and a reset knob. Movement of the plunger 86 toward and away from the body of the gauge actuates the pointer to produce readings up to thousandths of an inch on the dial by rotary movement of the pointer thereover. The reset knob permits manual reset of the gauge reading to zero where it is desired to establish a zero reading prior to use of the gauge. Such gauges, per se, are conventional equipment and may readily be purchased on the open market, forming, other than in the manner in which combined in applicant's device, no part of the present invention. A specific example of such a gauge is that known and sold as the McMaster-Carr gauge, catalogue Model 655–F1.

The plunger 86 of dial gauge 85 is provided with a threaded end 88. This threaded end passes through a threaded aperture provided in the bottom of an additional U-shaped bracket 90 which, like brackets 46, 46', is removable but rigidly fixed to the undersurface of the platform 2. Thus, it will be apparent that as bifurcated bar member 44 is raised or lowered a reading is produced on dial gauge 85 indicating exactly how much the bar moves with respect to platform 2. The threaded engagement effected between bracket 90 and the plunger 86 enables minute adjustments therebetween.

Referring now to the housing 12, consideration will be given to the components contained therein. Preferably, this housing is formed of a framework 92 formed of rigid components, the framework 92 being covered by relatively thin sheet metal members designated generally as sheets 94.

The framework 92 is so designed that a pair of depending ears 96, 96' are provided thereon. These ears are provided with suitable anti-friction bearing assemblies 98, 98', these assemblies defining spaced journals for receiving an end of a vertically movable lever 100. The lever 100 as well as the ears 96, 96' are so positioned within the housing that the lever 100 lies within and extends longitudinally in the tunnel-like passage 14, previously referred to, such that it overlies and is parallel to the direction of movement of a product through the passageway 14. An intermediate portion of lever 100 is bifurcated. Journaled in this latter bifurcated portion, in suitable antifriction bearing assemblies, is a sensing roller 102. It may be seen that the position of sensing roller 102 is such that it is directly aligned with reference roller 42 and in the absence of a product therebetween the two peripheral surfaces of these rollers contact such that a vertical plane passing through the axes of rotation of both rollers 42 and 102 will also pass diametrically through both rollers.

Finally, the other end of the lever 100, i.e., that end not pivotally connected to depending ears 98, 98', is pivotally connected to the forked end of a vertically disposed push-pull rod 104. Thus, it will be apparent that lever arm 100 may move vertically and in so doing will actuate push rod 104 either upwardly or downwardly.

Also suitably mounted within the housing 12 on framework 94 are a pneumatic precisor 105 and a transist recorder 110. Since both of these instruments are conventional and available on the open market and per se are no part of the present invention no detailed description of either is believed necessary. Their operation will, however, be described insofar as it is essential to understand their function in the invention. Prime examples of both instruments are as follows:

Precisor—Taylor Instrument Company, Precisor No. 113RF419, and

Transit Recorder—Nos. 86J or 66K also furnished by the Taylor Instrument Co., Rochester, New York.

These specific instruments are recited not by way of limitation, but by way of example since other equivalent equipment may be used.

The aforementioned lever connected push-pull rod 104 is connected to the precisor which functions as follows:

Within the instrument the rod 104 is connected to a control valve. This valve is supplied with air from a suitable source (not shown) at preferably about 20–22 p.s.i. and, in turn, the valve produces a variable output air pressure. Thus, the pneumatic output of the precisor may be varied in direct proportion to movements of the rod 104. If then as the invention contemplates, the output from the precisor is applied to the moving pen of a pneumatically operated recorder the variations in precisor output can be readily recorded on a moving chart.

The mentioned transit recorder performs the latter function, receiving the output from the precisor and converting variations in this output to pen movement which records these variations on a moving graph or chart. If then the speed of the chart or graph moving beneath the pen is directly proportional to the speed of the product moving between the rollers 42 and 102 a continuous record of thickness is produced.

The use of pneumatic controllers and recorders such as outlined above in the gauging and dimension recording apparatus defining the present invention has several great advantages. First of all, the referred to instruments are extremely sensitive and will record minute variations. Secondly, the number of linkages, pivots, etc., all used in the gauges of the prior art is reduced. Since such mechanical components are subject to wear, many points of inaccuracy and weakness are eliminated. Thirdly, the recorder is provided with damping valves which assure that only actual variations in precisor output are recorded while in mechanical sensing equipment, damping of chatter due to inherent looseness of parts presents an almost insurmountable problem, particularly where long continuous runs of products are passed through the gauging elements.

The initial set up of the apparatus and its operation will now be discussed and in so doing reference is again made to the continuous process described in FIGURE 1 by way of example, since the initial set up and subsequent operation of the gauge will be the same for any product. Let it be assumed that a simple stranded core plastic insulated cable is to be passed through the apparatus and gauged thereby. The diameter of the stranded core is .5 (one-half) inch. Further, it is desired that the thickness of the insulation be .125 (one-eighth) inch. It will be apparent then that if the stranded core has a diameter of .5 and the insulation .125 the overall measured diameter of the product should be .750 (three-fourths) inch. Therefore, if the overall diameter of the product indicates a constant reading based on these facts the run of insulated conductor will be satisfactory. Accordingly, the apparatus is set up for such a product.

Initial calibration of the device is effected by moving the reference roller 42 by manipulation of the knob 70 to a level above the platform 2 such that the angle defined between the longitudinal center lines of lever arm 100 and precisor push rod 104 is exactly 90°. Since the distance which push rod 104 will travel upward or downward is limited and can be determined by measurement, the length of this rod is adjusted such that the push rod is exactly halfway between the extremities of its stroke when the 90° angle referred to above is obtained. At the same time the dial indicator 85 is set to zero. Thus, the contacting members, reference roller 42 and sensing roller 102, are in contact at a line which lies in a median plane approximately half way between the limits of vertical travel of sensing roller and the precisor instrument. The apparatus can thus be considered as calibrated to zero.

Remembering that the product to be gauged has a diameter of .750 inch and in order to obtain a suitable plus and minus reading on the recorder, it becomes apparent that it would not be desirable to simply pass the product between the rollers 42 and 102 at a zero setting. Rather, after zero calibration, the lower or reference roller 42 is lowered until its position is exactly .750 inch below its zero calibrated position. This is determined from a direct reading of dial gauge 85 and effected by manipulation of knob 70. The set screw 75 is locked and then the product threaded through guide rolls 16, 18, 22 and 24 and between reference roll 42 and sensing roll 102. If the product is of the correct diameter it will be apparent that push rod 104 and lever 100 will again assume a zero, or 90° relationship and thus, the precisor and recorder in response to the output of the precisor will return to zero condition. The production run is then begun and the continuously moving graph in the recorder will be scribed with a line record indicating variations in overall diameter of the product.

Obviously, since the conductive core diameter is constant any variations in overall diameter indicate improper thickness of the insulation being deposited.

It is believed obvious that the invention has general utility in measuring and recording a great many dimensions. For example, the thickness of sheet being rolled can be measured by simply rearranging guide rolls 14, 16, 18, etc., such that the edge thereof passes between rolls 42 and 102.

As an additional precaution to reveal unusually great variations in thickness an alarm system may be provided in any one of several obvious ways whereby a bell rings, a light flashes, etc. should a portion of the product having unreasonable variations from the desired norm or average, pass through the gauge. Further, the recorder may be and generally is provided with a relief valve whereby when sudden surges of pressure occur due to sudden changes in measurement of the precisor no damage to recorder or precisor occurs as this valve relieves the pressure.

Various modifications and changes in the apparatus previously described can be made, all of which are within the spirit and scope of the invention, the scope of which is limited only as defined in the following appended claims wherein, what is claimed is:

1. An apparatus for gauging a given dimension of an article being continuously moved therethrough and for forming a permanent record of variations in the gauged dimension comprising a platform, a linearly movable reference roll disposed on one side of said platform and having its peripheral surface projecting beyond the opposite side of the platform, means including a bifurcated bar member for mounting said roll, means including screw jacks simultaneously engageable with opposite extremities of said bifurcated bar member for simultaneously adjusting the opposite extremities of said bar member and said reference roll with respect to said platform, a housing positioned on said last-mentioned side of said platform, means associated with said first-mentioned roll for indicating revolutions of said roll per unit time, said housing including a frame, a pivoted lever suspended from said frame, a roll affixed to said lever, said last-mentioned roll having its axis disposed parallel to and in the same plane as the axis of said first-mentioned roll whereby variations in the dimensions of an article passed between the rolls will cause movement of said pivoted lever, means in said housing for recording such variations, said means being pneumatically operated and controlled by the movements of said pivoted lever and adjustable push rod means directly connecting said pneumatically operated means with said pivoted lever.

2. A gauging apparatus as defined in claim 1 wherein said bifurcated bar member is provided with a bracket and said platform is provided with a bracket, the respective brackets being interconnected by a gauge means whereby movement of said reference roll toward and away from a median position may be ascertained.

3. A gauging apparatus as defined in claim 1 wherein the side of said platform above which said reference roll projects is provided with guide means which act to direct an article being gauged over said reference roll.

4. A device for continuously recording dimensional variations in a continuously moving article passing therethrough comprising a platform, a housing having a tunnel-like passage fixed to said platform, a sensing roll disposed in said passage and rotatable about an axis normal to the length of said passage, means including a pivot lever supporting said sensing roll in said passage, said platform having a slot therein elongated in a direction paralleling the length of said passage, a reference roll vertically aligned with said sensing roll and fixed to said platform, said reference roll projecting through said slot such that its peripheral surface cooperates with said sensing roll to gauge the dimension of a product passing between said rolls, means responsive to movements of said sensing roll due to the variations in the dimensions being measured for forming a continuous record of said variations, means for adjustably mounting said reference roll with respect to said platform while maintaining alignment between said rolls, said means comprising a bifurcated bar member disposed beneath said platform and disposed parallel thereto, bar member adjustment means including a pair of screw jacks each of which is connected to an opposite extremity of said bar member for adjusting the position of said bar member and reference roll, means for gauging the amount of adjustment between said reference roll and said platform, said sensing roll responsive means including a pneumatic recording apparatus, and means including a push rod directly and adjustably connected to said pivot lever and said pneumatic recording apparatus for actuating said pneumatic recording apparatus upon the movements of the sensing roll.

5. A device as defined in claim 2 wherein said adjustment means further includes a worm and pinion means connected to said pair of screw-jacks and manually operable to adjust both ends of said bifurcated bar simultaneously.

6. A device as defined in claim 2 wherein said housing is removably fixed to said platform and said sensing roll and recording means are mounted upon said housing and are removable therewith as a unit.

7. A device as defined in claim 2 wherein the axis of said push rod and said lever define an angle of 90° with respect to one another when said sensing roll is in contact with said reference roll and said reference roll is positioned in a zero calibrated condition prior to insertion of a product between the rolls for gauging therebetween.

References Cited in the file of this patent

UNITED STATES PATENTS

| | | |
|---|---|---|
| 762,010 | Uncapher | June 7, 1904 |
| 1,700,978 | Cogswell | Feb. 5, 1929 |
| 1,858,304 | McLaughlin | May 7, 1932 |
| 1,984,837 | Kronenberg | Dec. 18, 1934 |
| 2,051,258 | Hunt | Aug. 18, 1936 |
| 2,146,277 | Wilson | Feb. 7, 1939 |
| 2,332,289 | Zeitlin | Oct. 19, 1943 |
| 2,374,154 | Moore | Apr. 17, 1945 |
| 2,616,185 | White | Nov. 4, 1952 |
| 2,669,246 | Hard Af Segerstad | Feb. 16, 1954 |